United States Patent [19]

Baranski

[11] Patent Number: 4,974,898
[45] Date of Patent: Dec. 4, 1990

[54] TELESCOPING COVER FOR STORAGE FACILITIES

[76] Inventor: Irving Baranski, 625 Lakeshore Dr., Grosse Point Shores, Mich. 48236

[21] Appl. No.: 485,819

[22] Filed: Feb. 26, 1990

[51] Int. Cl.⁵ .............................................. B60P 7/02
[52] U.S. Cl. ...................................... 296/100; 296/10;
160/202; 220/8; 220/345
[58] Field of Search .......................... 296/10, 100, 105;
160/202; 220/8, 345

[56] References Cited

U.S. PATENT DOCUMENTS

| | | | |
|---|---|---|---|
| 2,853,340 | 9/1958 | Hershberger | 296/100 |
| 3,165,352 | 1/1965 | Hallock et al. | 296/100 |
| 3,640,565 | 2/1972 | Anderson | 296/100 |
| 4,068,886 | 1/1978 | Gostomski | 296/100 |
| 4,124,247 | 11/1978 | Penner | 296/100 |
| 4,289,346 | 9/1981 | Bourgeois | 296/100 |
| 4,397,497 | 8/1983 | Alonzo, Jr. et al. | 296/100 |
| 4,648,649 | 3/1987 | Beal | 296/100 |
| 4,659,136 | 4/1987 | Martin et al. | 296/100 |

*Primary Examiner*—Dennis H. Pedder
*Attorney, Agent, or Firm*—Remy J. VanOphem

[57] ABSTRACT

A telescoping cover for storage facilities, particularly vehicle cargo beds, which utilizes a plurality of cover sections in successive mutual telescopically receivable relation that slide on guideways in a self-cleaning manner. In the preferred embodiment, a plurality of movable cover sections are provided which are successively mutually telescopable into a stationary cover section through use of a pair of parallel guideways. Each cover has a top from which depend downwardly mutually opposing sides. The guideways, which are attached to the storage facility side walls, are made of an elongated base having a substantially flat surface from which extend a plurality of elongated bosses. The bosses have an upper portion which is disposed in offset relation to a lower portion which in turn mates with the elongated base. The movable cover sections have a slot in the lower terminus of each side receiving a boss. A detent is provided that protrudes into the slot, interfering with the offset upper portion of the boss and preventing vertical movement of the movable cover section. The surface shape of the slot and its associated detent in each side of the movable cover sections are mutually complementary with the surface shape of the boss received therein. Accordingly, as the movable cover sections are slid along the guideway accumulated debris is automatically wiped off the boss by interaction of the complementary surfaces.

17 Claims, 4 Drawing Sheets

TELESCOPING COVER FOR STORAGE FACILITIES

This is a continuation of application Ser. No. 07/291,405, filed Dec. 20, 1988, abandoned which is a continuation of Ser. No. 07/055,237, filed May 28, 1987, abandoned.

BACKGROUND OF THE INVENTION

1. Field of the Invention

The present invention pertains to retractable covers for storage facilities and more particularly to a telescoping cover having self-cleaning guideways on which it is designed to reciprocate.

2. Description of the Prior Art

Storage facilities may take many different forms, including vehicular cargo beds and stationary material containment structures. Tops designed to cover such storage facilities generally serve the purposes of providing security against entry by both the weather elements and unauthorized persons. The user, however, must be able to efficiently access the interior of the storage facility; thus, any provision for security must also take into account easy access. In addition, the special case of vehicular employment is particularly sensitive to the effects of wind when traveling at moderate to high speed, and provision must accordingly be made to ensure that integrity of seal between the top and the side walls is retained.

Several solutions have been advanced in the prior art which are directed to solving the particularly demanding conditions encountered in vehicular applications. These have generally two rather broad classes of approach: articulating covers, and retractable covers.

Articulating covers are generally composed of a plurality of segments which are designed to hinge upwards, thereby providing access to the interior of the storage area. U.S. Pat. No. 4,615,557 to Robinson discloses a panel cover having two sections which hinge transversely across the bed of a pickup truck and seat on a channel provided along the wall periphery. U.S. Pat. No. 4,313,636 to Deeds discloses a multiple segmented cover transversely hinged across a pickup truck bed, folding forwardly in the bed on an angle iron track. U.S. Pat. No. 4,284,303 to Hather discloses a two piece top which folds longitudinally along the pickup truck bed using hinged sections on the top of the side walls. All of these solutions require the user to lift a relatively large, unwieldy cover section which could in the process be very difficult under conditions of high wind.

Retractable covers are generally composed of segments which slidably move in relation to the storage facility, thereby permitting access to the interior of the storage area. Generally, these employ three types of methods that utilize either removable segments, accordion folding segments, or fan folding segments. Further, these generally employ a channel of either a "C" or "U" shape which is secured to the longitudinal side walls of the storage facility, which cooperate with a lip at either end of the longitudinal sides of the cover segments to permit slidable movement in the longitudinal direction while preventing movement in the transverse and vertical directions.

The removable segment solution is disclosed in U.S. Pat. No. 4,406,493 to Albrecht et al which describes a modular hard top for pickup truck beds, each component of which is slidably secured to the side walls via a "C" shaped channel cooperating with top segment lips.

The accordion folding solution is disclosed in U.S. Pat. No. 4,547,014 to Wicker which describes a generally "C" shaped channel mounted longitudinally on the side walls of a pickup truck which accepts for slidable movement therein a series of transverse cross members supporting a "C" shaped channel secured to the side walls of a pickup truck cooperating with a series of guides slidably moving therein to fold a bow structure supporting a flexible top material using a crank.

The fan-folding solution is disclosed in U.S. Pat. No. 4,611,848 to Romano which describes a "C" shaped channel mounted interiorly at the top of a pickup truck's side walls. A series of transverse cross members are movably supported by wheels located in the channels thereby allowing stiff cover panels to be crankably rolled onto a rewind tube. U.S. Pat. No. 4,550,945 to Englehardt describes a fan-folding segmented panel cover which rests on a pickup truck's side walls, utilizing pins for retention thereon. U.S. Pat. No. 4,518,194 to Kirkham et al describes use of "C" shaped channel designed to slidably cooperate with hinged slide bars supporting a plurality of segmented rigid cover panels, permitting folding of the panels forwardly in the bed by means of a motor actuating crank. U.S. Pat. No. 4,273,377 to Alexander describes use of a "U" shaped track located interiorly at the top side walls of a pickup truck which has a pair of grooves serving as guides for ball bearings that are integral on a bearing guide which support in turn a plurality of transverse support members. U.S. Pat. No. 4,252,362 to Campbell describes use of generally "C" shaped channels mounted to the interior side walls of a pickup truck in which are located a plurality of wheels that support, at each end, cross members which in turn support a flexible top material; the channel is designed to permit various amounts of the bed to be closeably covered.

U.S. Pat. No. 4,289,346 to Bourgeois discloses a retractable cover which employs a first embodiment utilizing the accordion fold method, whereby a generally "C" shaped channel positioned at the top of the side walls of a pickup truck is used to guide wheels connected to cross supports of flexible top material. In a second embodiment, a plurality of rigid top panels of progressively smaller dimension are designed to telescope successively one receivably into the other, with movement being enabled by utilization of the above mentioned "C" shaped channel and wheel combination in cooperation with a motorized mechanism.

In the prior art, there remains the problem of providing a cover for a storage facility, in particular a mobile vehicular facility, which is easy to operate, fully secure against the elements of weather and unauthorized entry, and substantially unaffected by environmental conditions that may cause debris to build up on the guides. Articulating covers are not easy to use, as mentioned above. Prior art retractable covers are subject to environmental conditions, particularly sand, dirt, or ice which can get into the "U" or "C" shaped channels used to guide reciprocation, causing impaired operability until the inhibiting conditions are removed. Accordingly, a retractable cover is needed which is substantially immune to these factors, and which yet provides a secure, easy to use covering for a storage facility, in particular those pertaining to truck cargo beds.

SUMMARY OF THE INVENTION

The present invention is directed to solving the need for providing a retractable cover for storage facilities, especially those used in vehicular applications, which is substantially insensitive to environmental debris accumulation on the guideways used to regulate reciprocation.

In the preferred embodiment, a plurality of cover sections in successive mutual telescopically receivable relation are employed, however, a flexible top material supported by a plurality of rib elements could be used in accordion-fold fashion. A guideway is provided at the top of each longitudinal section of the storage facility side wall. Each guideway is constructed of an elongated base which has a generally flat surface from which elongated bosses extend. The bosses are formed of a lower and upper portion. The lower portion mates with the guideway base in lengthwise parallel relation. The upper portion is disposed on the lower portion in lengthwise offset parallel and co-terminal relation. The cover sections have a top which forms a cover for the storage area, from which depend mutually opposing sides. Each cover section has a slotted lower terminus which allows one of the bosses on one guideway to be receivably inserted therein such that the cover section is mounted to the guideways. A detent is attached to the lower terminus of the cover section sides to prevent the cover sections from being vertically dislodged from the guideway by an interfering action with the offset upper portion of the received boss. Provision may be made for the use of wheeled load bearing members within the slotted lower terminus to ride along the upper portion of the received boss so as to reduce friction during reciprocation of the cover sections.

Because the guideway contains no "C" or "U" shaped channel that would easily accumulate dirt, sand or ice, and because it is very easily washed or wiped clean, there is virtually no likelihood that accumulation of debris could render reciprocation of the cover sections difficult to accomplish. Indeed, the interaction between the guideway bosses and the cover section slots is such that the respective surfaces are complementarily shaped in close proximate relation thereby causing a wiping action at the forward end of the cover as the cover is moved along the guideways causing the bosses to be cleaned free of debris every time the cover section is extended from the retracted position.

Additionally, the guideway is provided with an "L"-shape along its longitudinal length, one side of which, the base, rests on the top of the storage facility side walls and the other, an extension member depends vertically down the storage facility side wall whereat attachment is made of the guideway to the storage facility side walls. By incorporating a curved elbow structure, the guideway is able to transversely reciprocate in response to temperature induced dimensional variations between the cover section sides and the storage facility side walls.

Accordingly, it is an object of the present invention to provide a retractable storage facility cover that is easy to use and provides substantial storage access when retracted and security against the effects of weather and unauthorized entry when extended.

It is a further object of the present invention to provide a retractable storage facility cover that is designed for use in vehicular applications, particularly truck cargo beds, that is secure from the elements of weather even when the vehicle is driven at moderate to high speeds.

It is yet a further object of the present invention to provide a retractable storage facility cover which employs guideways for guiding reciprocable action of the cover, in which, because of complementarity of shape between the cover and the guideways, the guideways are self-cleaning and generally impervious to debris accumulation due to the effects of environmental conditions, such as sand, dirt or ice.

It is still a further object of the present invention to provide a retractable storage facility cover which is of rigid construction and has mounting means for connection to the side walls of the storage facility which allows for thermal expansivity of the cover in relation to the side walls.

DETAILED DESCRIPTION OF THE PREFERRED EMBODIMENT

Because the most demanding form of utilization of the invention is in applications involving motor vehicles, the preferred embodiment has been primarily directed to such employments. However, to those skilled in the pertinent art, it is clear that the principles used in making and using the invention for purposes of retractably covering a truck cargo bed can be readily adapted for the somewhat more simplistic conditions of operation appurtenant to use in stationary situations. Accordingly, it is to be understood that the description that follows is applicable to other usage configurations, and that, since motor vehicle use is the most complex, it is dealt with in particular hereafter.

While the preferred embodiment hereinbelow described utilizes a telescoping approach for providing a retractable cover, the present invention may be adapted for use with flexible top covers retracting in accordion-fold fashion. This will be discussed following the discussion of the telescoping preferred embodiment.

Figure 1:
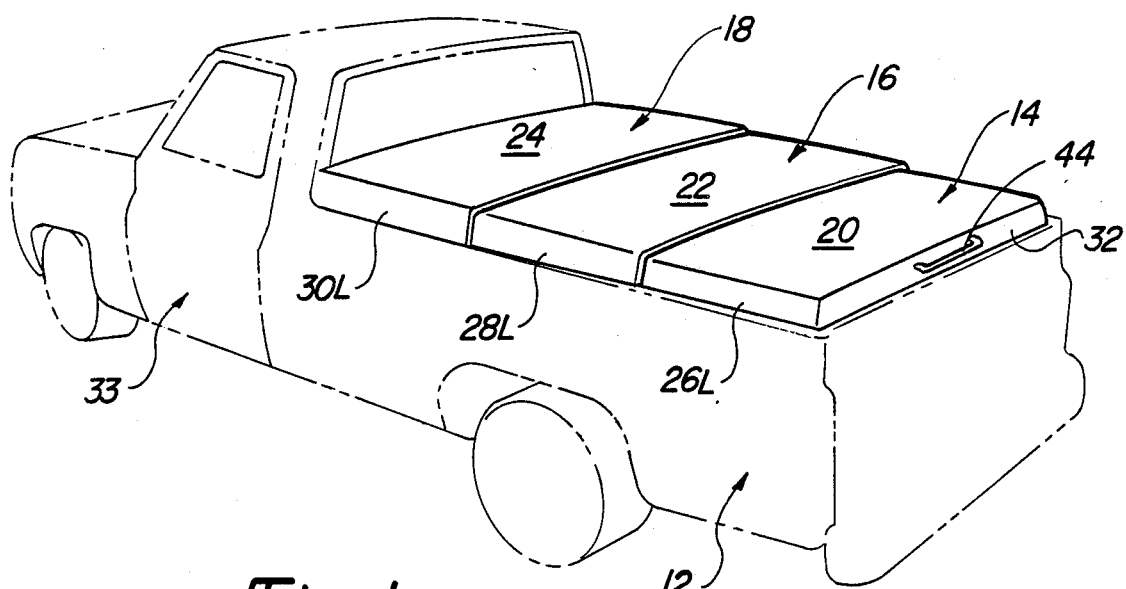
FIG. 1 is a perspective view showing the preferred embodiment of the invention mounted on a pickup truck cargo bed.

Referring now to the figures, FIG. 1 shows the retractable cover 10 according to the present invention mounted on the cargo bed of a pickup truck 12. The invention utilizes a plurality of rigid cover sections, a first cover section 14 which is movable, a second cover section 16 which is movable, and a third cover section 18 which is stationary, which are of successively larger size so that each is telescopically receivable into the other in the order of the first movable cover section 14 into the second movable cover section 16 and the combination of the first movable cover section 14 and the second movable cover section 16 into the third cover section 18. The cover sections are designed so that each covers a portion of the cargo bed and collectively they cooperate when extended to completely cover the cargo bed. Each cover section is formed having a rigid top 20, 22 and 24, respectively, from which depend mutually opposing sides 26L, 28L and 30L, respectively, where L designates the left or driver's side of the vehicle in FIG. 1, forming a generally rectangular box shape; the right side cover section sides are not shown. The first movable cover section 14 has a rear end wall 32 transversely positioned between the cover section sides of the first movable cover section, which serves to complete the coverage of the area above the cargo bed. The third cover section 18 closest to the front of the vehicle cab 33 is stationary relative to the vehicle, and the first and second movable cover sections 14 and 16 are telescopically receivable into it. It will be understood, therefore, that at least one movable cover section must be used in addition to the third stationary cover section 18; the use of the two first and second movable cover sections 14 and 16 in the figures is for illustrative purposes only and not intended to be limiting, as any reasonable number could have been chosen. It will be noticed that the cover sections, when fully extended, form a complete covering of the truck cargo bed. Each cover section when extended is structured to sealingly mate with adjacent panels thereby preventing entry by the elements of weather, such as rain, as well as entry by unauthorized persons. Additionally, particularly valuable cargo is hidden from sight of passersby.

Figure 2:
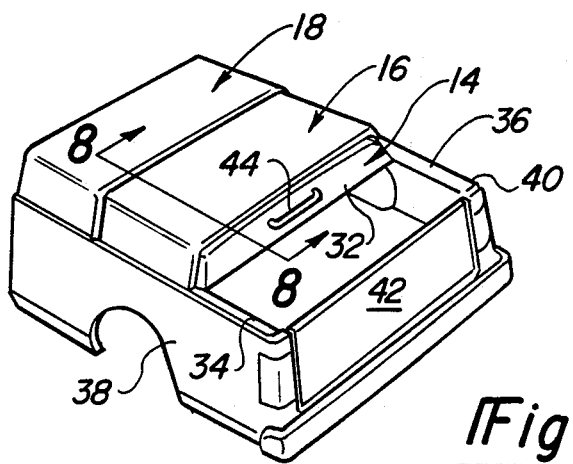
FIG. 2 is a perspective view of the invention mounted as in FIG. 1 where one of the cover sections has been telescopically received into one of the other cover sections.
Figure 3:
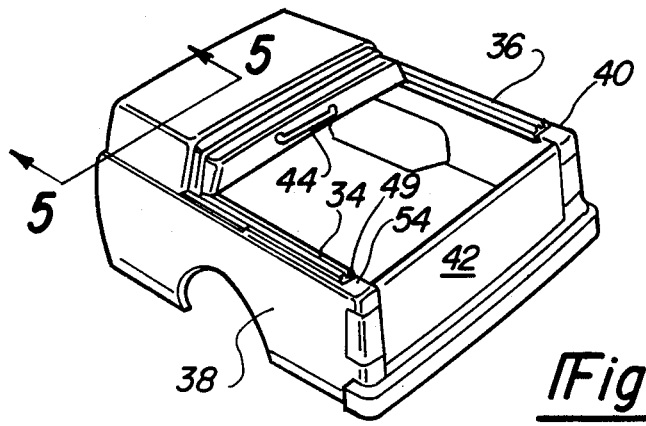
FIG. 3 is a perspective view as in FIG. 2 where the cover, sections are now fully telescopically retracted, thereby, exposing the cargo bed.

FIG. 2 shows the invention in which the first movable cover section 14 has been telescopically retracted into the second movable cover section 16. This is enabled by the placement of the first and second movable cover sections 14 and 16 on guideways 34 and 36 that are affixed to the top of cargo bed side walls 38 and 40 thereby permitting the movable cover sections to slide longitudinally along the top of the cargo bed side walls. The exact manner of the cooperative operation of the guideways with respect to the cover sections will be described in detail hereinbelow. It can be seen in FIG. 2 that some entry is gained to the cargo bed in the area of the tail gate 42, with the first movable cover section 14 being retracted. The movement of the first movable cover section 14 so that it is telescopically received into the second movable cover section 16 is accomplished by pushing on the end rear wall 32 of the first movable cover section 14 on which is provided a handle 44 for this purpose. FIG. 3 shows the result of continued application of force applied to the end rear wall 32, in which the first and second movable cover sections 14 and 16 are now both telescopically received into the third stationary cover section 18. It will be seen that the cargo bed is substantially open, the only remaining covered area being that occupied by the third stationary cover section 18.

Figure 4:
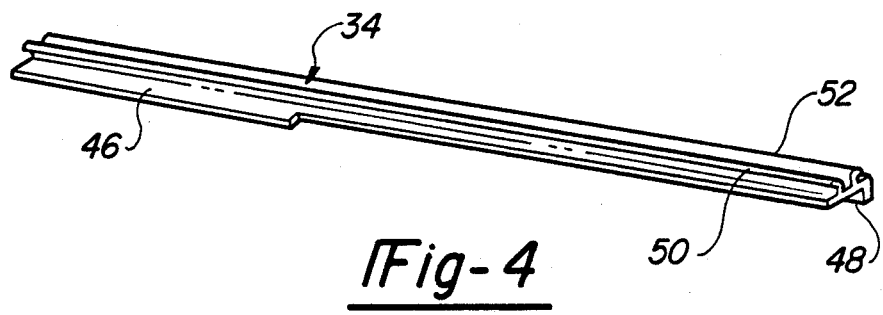
FIG. 4 is a detailed perspective view of the guideway.

The scenario for extending the cover sections to again cover the cargo bed is accomplished by pulling on the handle 44, as will be more fully described hereinbelow. As indicated above, slidable movement of the first and second movable cover sections 14 and 16 is accomplished by use of the guideways 34 and 36. The structure of the guideway can be understood by reference to FIGS. 4 and 5, which shows the left-hand cargo bed guideway 34 located on the driver's side of the vehicle. It will be seen from the figure that the guideway is formed of an elongated base 46 which is substantially flat so it can rest on the top of a cargo bed side wall. The elongated base 46 has along one of its longitudinal sides a downwardly depending extension member 48. The extension member 48 is used to secure the guideway to an interior side 49 of the cargo bed side wall 38. Extending upward from the elongated base 46 are two elongated bosses 50 and 52 which extend lengthwise, generally the length of the guideway in parallel relation thereto. Their purpose is to guide the sliding movement of each movable cover section in cooperation with slots 68 and 70 provided in each movable cover section side, respectively.

Figure 5:
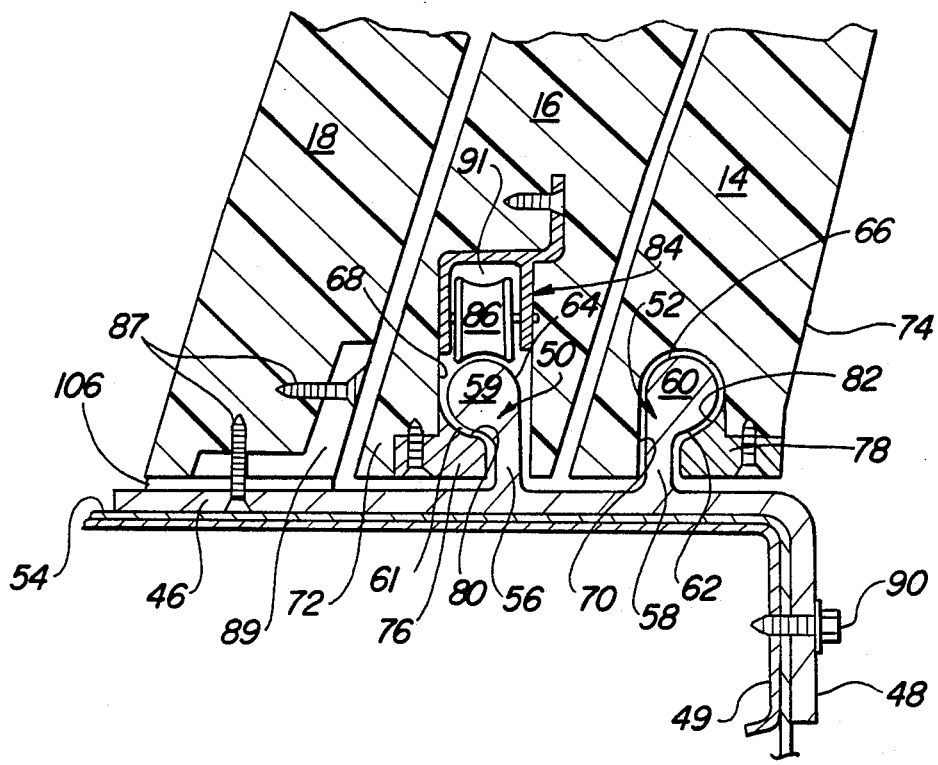
FIG. 5 is a cross-sectional view along lines 5—5 in FIG. 3 showing the cooperative relationship between the cover sections and the guideway.

The exact cooperation between the cover sections and the guideways is shown in FIG. 5 (a small separation between the boss and the slot being shown in the interest of clarity), which is a cross-sectional view of the invention from the rear of the vehicle, particularly at the top 54 of the left, or driver's side, cargo bed side wall 38. It can be seen from FIG. 5 that each of the elongated bosses 50 and 52 have a lower portion and an upper portion. The lower portion of each boss 56 and 58, respectively, is formed of a narrow segment which mates with the guideway elongated base 46 in lengthwise parallel relation thereto and in extending relation therefrom. The upper portion of each boss 59 and 60, respectively, is of generally circular cross-section and is co-terminously disposed in offset relation to one side of the lower portion of each boss; the surface direction of the lower portion is followed on the opposite side 64 and 66, respectively, of the upper portion of each boss. The bosses, therefore, have a lower portion and an upper portion which is offset 61, 62 to one side, along the length of the boss. As mentioned above, the first and second movable cover sections 14 and 16 have a slot 70 and 68, respectively, located in the lower terminus 74 and 72 of each side, respectively, running parallel with the side for allowing one of the bosses on one guideway to be receivably inserted thereinto such that the cover section is mounted to the guideways. In particular, it is seen that the elongated boss 50 is located in the slot 68 of the second movable cover section 16 and the elongated boss 52 is located in the slot 70 of the first movable cover section 14. The mutual separation of the elongated bosses is determined generally by the movable cover section wall thickness, as shown in FIG. 5, there being one elongated boss on each guideway for each movable cover section. In order that the movable cover sections be held onto the guideways against vertical forces, a detent 76 and 78, respectively, is attached to the movable cover so as to protrude into the respective slot. The detent acts to interfere with the upper portion of the boss, retaining the movable cover section from vertical movement. FIG. 5 shows that the offset surface 61 and 62, respectively, of each boss upper portion, interferingly contacts a detent surface 80 and 82, respectively, of the slot in which the boss is received. The detent is removably attached to each movable cover section side lower terminus. Alternatively, it could be an integral part of the movable cover section. A relationship similar to that just described exists between the guideway boss and the movable cover section slot and detent on the opposite, or passenger side wall of the vehicle cargo bed, not shown. The stationary third cover section 18 is attached to the guideways 34 and 36 in any convenient manner using any conventional fastener, such as a screw 87 and a mounting bracket 89.

While the use of elongated bosses of the shape shown is preferred, other shaped bosses are intended. The structural criteria is to provide a shape which provides for only substantially longitudinal sliding movement of the movable cover sections along the guideway. This is accomplished by (1) using a boss which is receivable into the slot at the lower terminus of each movable cover section, permitting only substantially longitudinal movement; and (2) providing an offset in the upper portion relative to the lower portion of the boss which enables an interference with the detent on the movable cover sections, thereby preventing vertical movement of the movable cover sections from the guideway. Each movable cover section side slot is structured so that its surface shape is mutually complementary to that of the surface of the boss inserted within it, where the detent provided in the movable cover section wall forms part of the surface of the slot. Thus, the cover section slot shape coupled with the detent shape form a surface complementary to the boss surface. When the movable cover section is slid along the guideway, the complementarity of the movable cover section slot surface and boss surface creates a wiping action on the boss at the leading edge 83 of the movable cover section slot surface, as particularly shown in FIG. 6, cleaning off any accumulated debris that may have been present on the boss. This may be particularly understood by reference to FIG. 3. A pulling action on the handle will cause the cover sections to successively extend. As this occurs, the leading edge of each cover section slot surface will wipe clean the boss surfaces of any dirt, sand or ice that may be present thereon. This is possible because the bosses are of a shape which cannot significantly accumulate clogging debris, which would be very likely to happen in designs using "U" or "C" shaped channels, coupled with the fact that the slot in the movable cover sections is complementarily shaped to wipingly engage the boss surface as it slides in the extending direction. Thus, the problem of impaired operation of retractable cover systems due to exposure to environmentally born debris is substantially eliminated.

Figure 6:
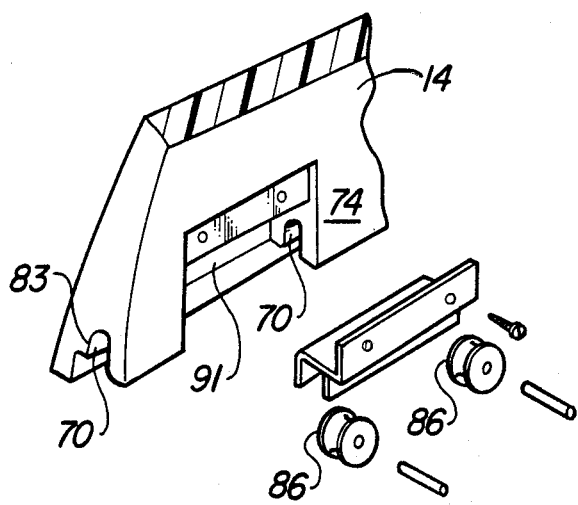
FIG. 6 is a perspective view showing an alternative embodiment in which one of the cover sections is provided with a load bearing roller means.

FIG. 6 discloses an alternative embodiment in which a roller bearing system 84 employing a plurality of rollers 86 is used to carry the majority of the second movable cover section weight loading onto the upper portion of the boss received in the slot of the second movable cover section. This structure reduces the effort of the user in overcoming friction as the second movable cover section is slid along the guideway. As indicated in FIG. 6, the roller bearing system is inserted into a side cavity 91 in the second movable cover section side at its lower terminus, the shape of the slot leading edge 83 of the cover section remains intact, as described above, so that the complementarity of the second movable cover section and slot surface boss surface continue in wiping cooperation. FIG. 5 shows the roller bearing system in operation on the second movable cover section 16. The first movable cover section would have a similar roller bearing system and side cavity.

Figure 7:
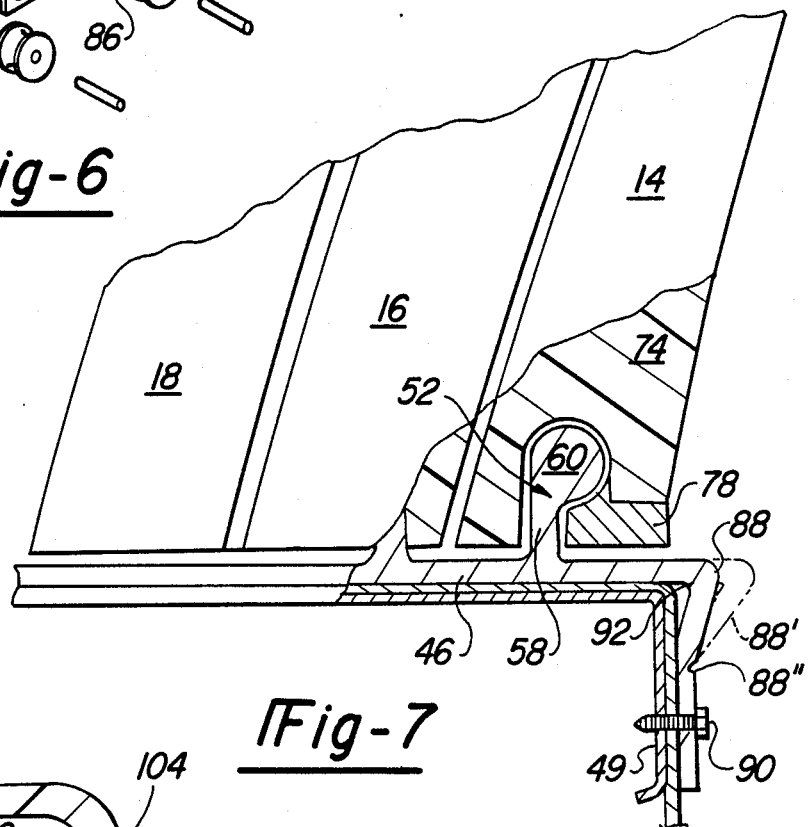
FIG. 7 is a detailed side view partially in cross-section as taken along lines 5—5 in FIG. 3 showing an alternative embodiment for the guideway which allows for transverse thermal expansivity of the cover sections.

FIG. 7 discloses an alternative embodiment of the guideway in which the extension member 48 is made to incorporate a curved elbow 88 along its downward length. It will be seen from the figure that the curved elbow is located between where the extension member fastens 90 to the cargo bed side wall and its connection 92 to the elongated base 46. The purpose of the curved elbow in the extension member is to allow for thermal expansion of the cover sections in a transverse direction between the side walls of the cargo bed. Decreased transverse cover section width on cold days is accommodated by a resiliently biased distortion in the curved elbow of the extension member 48 away from the interior side of the cargo bed side wall 49, as shown in the figure; increased transverse cover section width on hot days is accommodated by a resiliently biased distortion in the curved elbow of the extension member 48 toward the cargo bed side wall.

Figure 8:
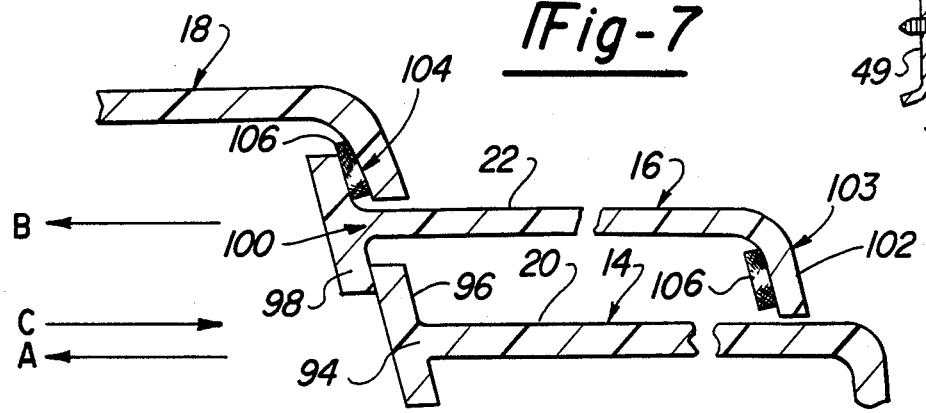
FIG. 8 is a partial cross-sectional view along lines 8—8 in FIG. 2 showing a structure for providing telescopic cooperation among the cover sections.

FIG. 8 shows the way in which the cover sections are caused to be in mutual telescopically receivable sealing relation. The forward end 94 of the first movable cover section 14 has an upwardly disposed member 96 on its top 20 which contacts a downwardly disposed member 98 in a forward end 100 of the top 22 of the second movable cover section 16 when the first movable cover section 14 has been fully telescoped into the second movable cover section 16 along the direction of arrow A. Further pushing on the rear of the first movable cover section 14 at the handle 44 causes a collective sliding movement of the first and second movable cover sections 14 and 16 telescopically into the third stationary cover section 18 along arrows A and B. In the reverse direction, pulling on the handle 44 causes the first movable cover section 14 to extend separately along arrow C until the forward end of the upwardly disposed member 96 of the top 20 of the first movable cover section 14 strikes the rearward end of a second downwardly disposed member 102 at a rearward end 103 of the top 22 of the second movable cover section 16, in the manner shown for the interaction 104 between the second movable cover section 16 and the third stationary cover section 18 in the figure. Further pulling on the first movable cover section 14 causes collective motion along arrow C of the first movable cover section 14 with the second movable cover section 16 until both movable cover sections are fully extended telescopically out of the third stationary cover section 18. Gasket materials 106 are employed to ensure sealing between the cover sections.

Operation and use of the invention can be understood as follows:

The invention is installed on the vehicle by first attaching the guideways on the top of the cargo bed side walls. Next, the first and second movable cover sections are positioned so as to have their upwardly and downwardly disposed members on each top, respectively, in interlocking relation, as shown in FIG. 8, then slid onto the guideway. Lastly, the stationary cover section is attached on the guideway.

The cover sections, when completely extended cover the guideway, prevent debris from accumulating on it as well as the cargo bed. When the movable cover sections are retracted by a sliding action along the guideway, the bosses are exposed to the environment and, consequently, the potentiality of debris build-up. When it is desired to extend the cover sections, the complementarity of the leading edge surface of the slot in the lower terminus of the movable cover sections and the surface of the bosses causes the bosses to be wiped clean of any debris that has accumulated as the movable cover section is pulled along the guideway, preventing caking of debris and consequent impairment of operation of the sliding action of the movable cover sections, as would occur in channel guided cover systems. While a self-cleaning function is achieved, the interference action of the bosses and the detents prevents removal of the cover sections vertically out of the slot. Additionally, the mechanism for mutual telescopic receivability of the cover sections, as shown in FIG. 8, also positively provides end points of travel on the guideway for the sliding of the movable cover sections.

Figures 9, 10:
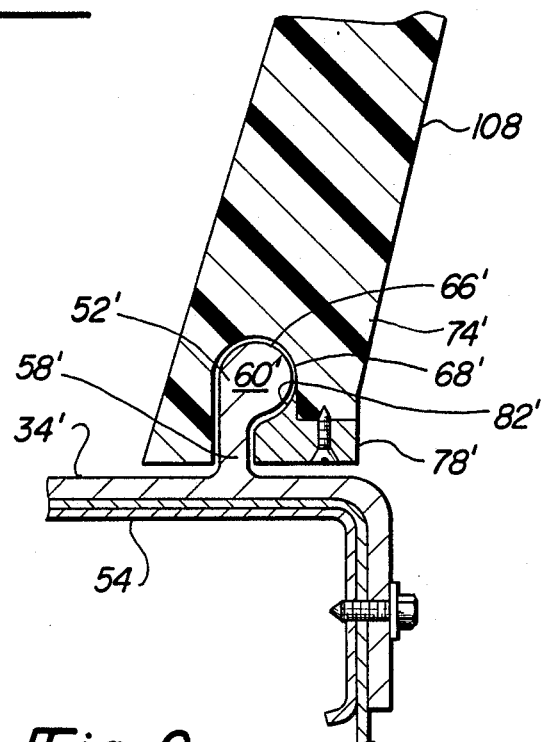
FIG. 9 is a cross sectional view as in FIG. 5 of an alternative embodiment of the invention showing the cooperative relationship between a rib and the guideway.
FIG. 10 is a part sectional sideview of the alternative embodiment of FIG. 9.

While the preferred embodiment has been directed to a telescoping configuration of rigid cover sections, it is possible to use the invention in situations where the rigid cover section is replaced by a flexible top material which is supported by a plurality of rib elements each having a pair of ends, each end connecting with the guideway in the manner described for the rigid panel configuration as shown in FIGS. 9 and 10. Such configuration would utilize an accordion-fold method for retracting the cover 110 and each rib element 108 may slide along a single boss 52' having an upper portion 60' and a lower portion 58' on each guideway. Each end of each rib element forms a lower terminus 74' which is configured in the manner described above for interfacing with the guideway 34' and its boss 52' through use of a slot and detent, which surfaces 82' are in mutual complementary shape to the surface 66' of the boss. A description of a flexible top embodiment that could be adapted to be used with the guideway means described in the present invention is disclosed in the above referenced U.S. Pat. No. 4,289,346.

To those skilled in the art to which this invention appertains, the above described preferred embodiment may be subject to change or modification. Such changes or modifications can be carried out without departing from the scope of the invention, which is intended to be limited only by the scope of the appended claims.

What is claimed is:

1. A retractable cover and guideway combination, comprising:
    a pair of mutually parallel elongated guideways, each elongated guideway of said pair of mutually parallel elongated guideways having a base;
    at least one elongated boss extending upwardly from each said base, said at least one elongated boss having a lower portion attached to said base and an upper portion attached in offset relation to said lower portion;
    a plurality of cover sections, each cover section of said plurality of cover sections having mutually opposing sides, said sides being interconnected by a top, each of said mutually opposing sides of at least one of said cover sections further having a leading edge and a trailing edge and a slot located at a lower terminus thereof extending between said leading edge and said trailing edge, said sides being in mutual spaced apart parallel relation such that each of said slots receives a respective one of said at least one elongated boss extending upward from said base of a respective one of said pair of guideways, said respective one elongated boss received in said slot forming a first surface and said slot receiving said respective one elongated boss forming a second surface, said first and second surfaces cooperating to guide said cover section as said cover section is moved along said respective one elongated boss, said first and second surfaces further having, at least at said leading edge of each of said sides, a complementary shape, said first and second complementary shaped surfaces being separated from each other by a small space so that, as each of said cover sections is moved along said guideway, said leading edge of each side cleans said first surface of said received at least one elongated boss of debris which is larger than said small space between said first and second complementary shaped surfaces;
    a roller bearing system attached to each of said mutually opposing sides of said at least one cover section, said roller bearing system being disposed along said slot intermediate said leading edge and said trailing edge of each of said sides, so as not to interfere with said received at least one elongated boss being cleaned by said leading edge of debris which is larger than said small space between said elongated boss and said leading edge as said cover section is moved out of a telescopically received relation, said roller bearing system contacting said upper portion of said received at least one elongated boss to reduce the friction between said received at least one elongated boss during movement of said cover section along said pair of mutually parallel elongated guideways; and
    means for retaining said plurality of cover sections in mounted relation with respect to said pair of mutually parallel elongated guideways.

2. The retractable cover and guideway of claim 1, wherein said plurality of cover sections are in successive mutual telescopic receivable relation and each said slot has received therein a separate said received elongated boss.

3. The retractable cover and guideway of claim 1, wherein each of said plurality of cover sections is comprised of a plurality of rib elements supporting a flexible cover material, each of said rib elements having a pair of ends, each of said ends having said slot.

4. The retractable cover and guideway of claim 1, wherein means for said retaining comprises a detent protruding into said slot so as to interfere with said offset upper portion of said received elongated boss to prevent substantial vertical movement of said at least one cover section of said plurality of cover sections in relation to said received elongated boss.

5. A telescoping cover for a storage facility, having two mutually opposite side walls comprising:
    a pair of elongated guideways, said pair of elongated guideways being mounted in mutually parallel relation on said storage facility, each elongated guideway of said pair of elongated guideways having a base;
    a plurality of cover sections, each having a predetermined size;
    means for mounting said plurality of cover sections for movement along said pair of elongated guideways, said predetermined size of each of said cover sections allowing for said plurality of cover sections to be mounted in successive mutual telescopically receivable relation, said means for mounting further limiting said movement of said plurality of cover sections to a movement along said pair of elongated guideways;

means for cleaning said pair of elongated guideways when said plurality of cover sections are moved out of a successive mutual telescopically received relation along said pair of elongated guideways;

means for coupling said plurality of cover sections so as to be movable along said pair of elongated guideways in successive mutual telescopically receivable relation; and a downwardly disposed extension member attached to each said base, each said extension member having at least one attachment point along its length for attaching a respective elongated guideway of said pair of elongated guideways to one of said two mutually opposite side walls of said storage facility, at least one said extension member including a curved elbow located between said base and said at least one attachment point of said at least one extension member to one of said side walls, for allowing said base to move transversely relative to said side walls in response to changes in width said plurality of cover sections due to variations in temperature.

6. The telescoping cover of claim 5, wherein each base of said pair of elongated guideways includes an upwardly extending plurality of elongated bosses, said upwardly extending plurality of elongated bosses having a lower portion attached to said base and an upper portion attached in offset relation to said lower portion.

7. The telescoping cover of claim 6, wherein at least one of said plurality of cover sections is a movable cover section that is movable along said pair of elongated guideways, and wherein each cover section of said plurality of cover sections has a pair of mutually opposing sides interconnected by a top, and wherein said means for mounting comprises a slot located at a lower terminus of each of said pair of mutually opposing sides of said movable cover section, each of said slots respectively receiving one of said upwardly extending plurality of elongated bosses.

8. The telescoping cover of claim 7, wherein said means for mounting further comprises a detent attached to each side of said movable cover section which protrudes into each said slot so as to interfere with said offset upper portion of each of said upwardly extending plurality of elongated bosses to prevent substantial vertical movement of each of said movable cover sections in relation to said pair of elongated guideways.

9. The telescoping cover of claim 8, wherein said means for cleaning comprises each said slot and detent forming a first surface located at a leading edge of said mutually opposing sides of said at least one movable cover section and said boss received in said slot forming a second surface, said first and second surfaces being complementarily shaped in close proximate relation so that said received upwardly extending elongated boss is cleaned of debris as each of said movable cover section of said plurality of cover sections is moved out of said successive mutual telescopically received relation along said pair of elongated guideways.

10. The telescoping cover of claim 9, wherein said coupling means comprises selective contact between upward and downward disposed members selectively located on each said top of said plurality of cover sections for causing said movable cover section to move in a telescopically received relation when said movable cover section is moved along said pair of elongated guideways.

11. A telescoping cover for a storage facility, comprising:

a pair of parallel guideways, each guideway of said pair of parallel guideways having a base;

a pair of extension members each downwardly disposed along a longitudinal edge of a respective base, each said extension member of said pair of extension members having at least one attachment point along its length for attaching a respective guideway of said pair of parallel guideways to one of two mutually opposite side walls of said storage facility;

at least one elongated boss extending upwardly from said base, said at least one elongated boss having a lower portion attached to said base and an upper portion attached in offset relation to said lower portion, said at least one elongated boss forming a first surface;

a stationary cover section having mutually opposing first sides, said first sides being interconnected by a first top, said first sides being in mutual spaced apart relation such that said stationary cover section is mounted to said side walls of said storage facility;

at least one movable cover section having mutually opposing second sides, said second sides being interconnected by a second top, said second sides each having a slot located at a lower terminus thereof, said second sides being in mutual spaced apart relation such that each said slot of each of said second sides of said at least one movable cover section receives said at least one elongated boss on each said parallel guideway, said at least one movable cover section being of a size such that when said guideways said at least one movable cover section is telescopically receivable into said stationary cover section;

a detent attached to said at least one movable cover section in protruding relation with respect to said slot, said detent forming a portion of said slot so as to interfere with said upper portion of said received elongated boss to prevent substantial vertical movement of said at least one movable cover section in relation to said received elongated boss, said slot of each of said second sides together with said detent forming a second surface, said second surface being located at least at a leading edge of a lower terminus of each of said second sides, said first and second surfaces being complementarily shaped and in close proximate relation;

a curved elbow integral with each one of said extension members of said pair of extension members, said curved elbow being located between said respective base and said at least one attachment point of each one of said extension members to said one of two mutually opposite side walls for allowing said base to move transversely relative to said one of two mutually opposite side walls in response to changes in width of said cover sections due to variations in temperature; and a bearing system in each lower terminus of each of said second sides, said bearing system being located remote from said leading edge of said lower terminus, said bearing system being in bearing contact with said upper portion of said received at least one elongated boss for reducing friction between said received at least one elongated boss during movement of said at least one movable cover section along said pair of parallel guideways.

12. The telescoping cover of claim 11, wherein said storage facility is a motor vehicle cargo bed having side walls and each said base of said pair of parallel guideways is respectively connected to one of said cargo bed sidewalls.

13. The telescoping cover of claim 11, wherein more than one movable cover section is present, each of said movable cover sections being in mutual successive telescopically receivable relation to each other and to said stationary cover section, each of said movable cover sections being movably mounted to said pair of parallel guideways such that there is one said boss for each said slot on each of said second sides of each said movable cover section.

14. The telescoping cover of claim 13, further comprising coupling means between said stationary cover section and said movable cover sections for coupling said stationary cover section and said movable cover sections in mutual successive telescopically receivable relation when said movable cover sections are moved along said pair of parallel guideways.

15. The telescoping cover of claim 14, wherein said movable cover sections and said stationary cover section each have a top; said coupling means comprising selective contact between upward and downward disposed members selectively located on each said top for causing said movable cover sections to move in mutual successive telescopically receivable relation when said movable cover sections are moved along said parallel guideways.

16. The telescoping cover of claim 11, wherein said upper portion of each said boss is substantially circular in cross-section having a diameter defined by a first length, said lower portion of each said boss is substantially rectilinear in cross-section having a width defined by a second length, where said first length is greater than said second length.

17. The telescoping cover of claim 10, further comprising a bearing system in each said lower terminus of each of said mutually opposing sides, said bearing system being located remote from said leading edge of said lower terminus so as not to interfere with said received elongated boss being wiped clean as said at least one movable cover section is moved out of telescopically received relation, said bearing system being in bearing contact with said upper portion of said received elongated boss for reducing friction between said received elongated boss during movement of said movable cover section along said pair of parallel guideways.

* * * * *

UNITED STATES PATENT AND TRADEMARK OFFICE
CERTIFICATE OF CORRECTION

PATENT NO. : 4,974,898

DATED : December 4, 1990

INVENTOR(S) : Irving Baranski

It is certified that error appears in the above-identified patent and that said Letters Patent is hereby corrected as shown below:

Column 2, line 8, after "a" insert ---- flexible top material. U.S. Patent 4,285,539 to Cole describes a generally ----.

Column 2, line 22, delete "channel" and insert --- channels interiorly at the top of the pickup truck's side walls which are ---.

Column 4, line 27, delete "cover," and insert ---- cover ----.

Column 4, line 44, delete "cross sectional" and insert ---- cross-sectional ----.

Column 4, line 47, delete "FIG. 10 is a part sectional sideview of the".

Column 4, before line 47, insert with paragraph indention ---- FIG. 10 is a part sectional side view of the ----.

Column 9, line 27, after "guideway" insert ---- 34' ----.

UNITED STATES PATENT AND TRADEMARK OFFICE
CERTIFICATE OF CORRECTION

PATENT NO. : 4,974,898

DATED : December 4, 1990

INVENTOR(S) : Irving Baranski

It is certified that error appears in the above-identified patent and that said Letters Patent is hereby corrected as shown below:

Column 10, line 45, delete "means for said" and insert ---- said means for ----.

Column 11, line 20, after "width" insert ---- of ----.

Column 12, line 35, after "said" first occurrence insert ---- at least one movable cover section is moved along said pair of parallel ----.

Signed and Sealed this

Twenty-eighth Day of July, 1992

Attest:

DOUGLAS B. COMER

*Attesting Officer*   *Acting Commissioner of Patents and Trademarks*